(12) United States Patent
Healy, Jr. et al.

(10) Patent No.: US 8,746,300 B2
(45) Date of Patent: Jun. 10, 2014

(54) SYSTEM FOR INTEGRATING ELECTRONIC MONITORS INTO A ROOM DECOR

(76) Inventors: James E. Healy, Jr., Chicago, IL (US); Susan F. Healy, Chicago, IL (US)

( * ) Notice: Subject to any disclaimer, the term of this patent is extended or adjusted under 35 U.S.C. 154(b) by 247 days.

(21) Appl. No.: 13/220,785

(22) Filed: Aug. 30, 2011

(65) Prior Publication Data

US 2013/0050940 A1 Feb. 28, 2013

(51) Int. Cl.
*B65D 65/02* (2006.01)

(52) U.S. Cl.
USPC .......... 150/165; 160/368.1; 160/352; 312/7.2

(58) Field of Classification Search
USPC ............... 160/368.1, 352; 348/841, 836, 818; 312/7.2; 150/154, 165
See application file for complete search history.

(56) References Cited

U.S. PATENT DOCUMENTS

| | | | | |
|---|---|---|---|---|
| 2,590,767 A | * | 3/1952 | Guarino et al. | 160/34 |
| 5,499,793 A | * | 3/1996 | Salansky | 248/442.2 |
| 5,894,878 A | * | 4/1999 | Morgan et al. | 160/354 |
| 6,133,966 A | | 10/2000 | Dyballa | |
| 6,209,973 B1 | * | 4/2001 | Steinberg | 312/7.2 |
| 6,402,269 B1 | * | 6/2002 | Roth | 312/7.2 |
| 6,709,078 B2 | | 3/2004 | Johnson | |
| 6,826,859 B1 | * | 12/2004 | Lin | 40/514 |
| 6,846,083 B1 | | 1/2005 | Mylar | |
| D514,114 S | * | 1/2006 | Cochard | D14/450 |
| 7,312,836 B2 | | 12/2007 | Maxson | |
| D567,245 S | * | 4/2008 | Edwards | D14/448 |
| D664,129 S | * | 7/2012 | Mora | D14/239 |
| 2008/0112842 A1 | * | 5/2008 | Edwards | 422/2 |
| 2013/0050940 A1 | * | 2/2013 | Healy et al. | 361/692 |

* cited by examiner

*Primary Examiner* — Blair M. Johnson
(74) *Attorney, Agent, or Firm* — Wood, Phillips, Katz, Clark & Mortimer

(57) ABSTRACT

A monitor system having: a) a monitor for an electronic device with a frame and a substantially flat front wall, at which an image is projected; and b) a cover assembly with a front wall that is configured to block the flat front wall of the monitor with the cover assembly operatively engaged with the monitor. The cover assembly further has a mounting assembly that allows the cover assembly to be changed between: i) a first state wherein the cover assembly is fully separated from the monitor; and ii) a second state wherein the cover assembly is operatively engaged with the monitor. The mounting assembly has a pocket that opens in a first direction. The pocket is movable in the first direction relative to the monitor from a separated, pre-assembly position to cause a first part of the monitor to be seated in the pocket with the cover assembly in the second state.

16 Claims, 4 Drawing Sheets

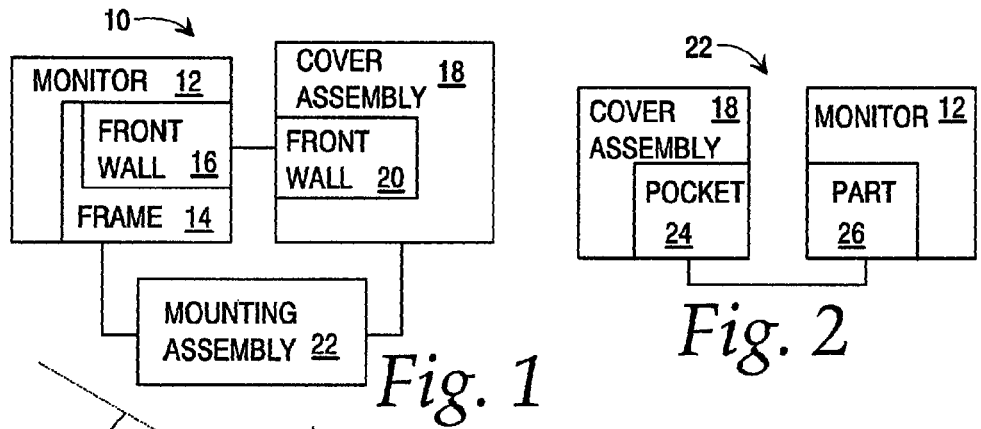
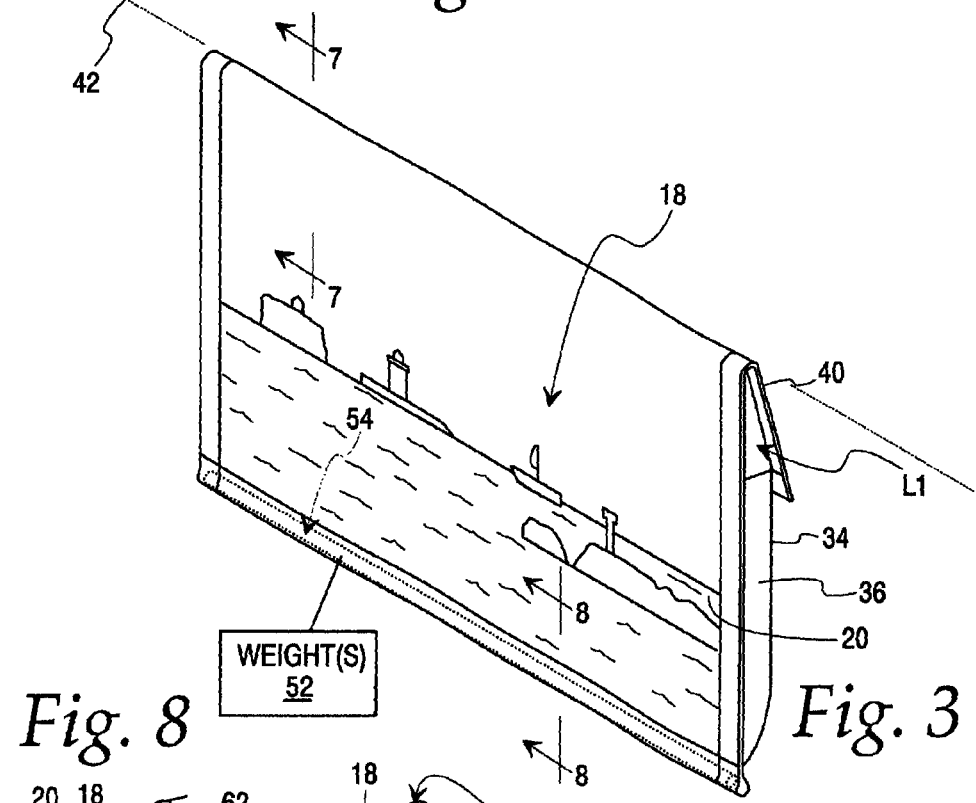
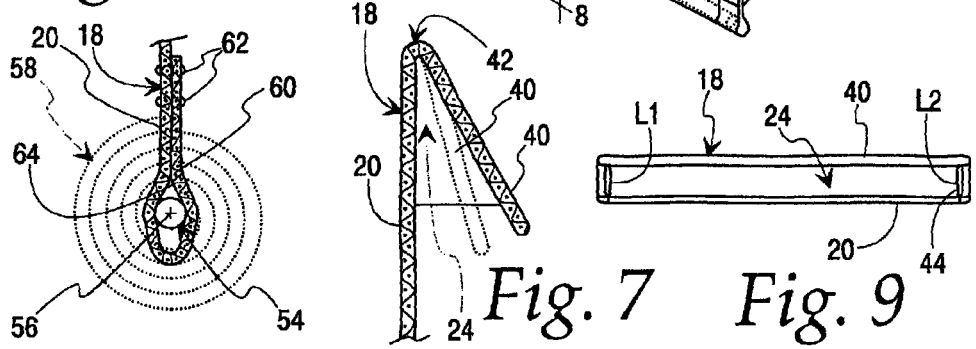

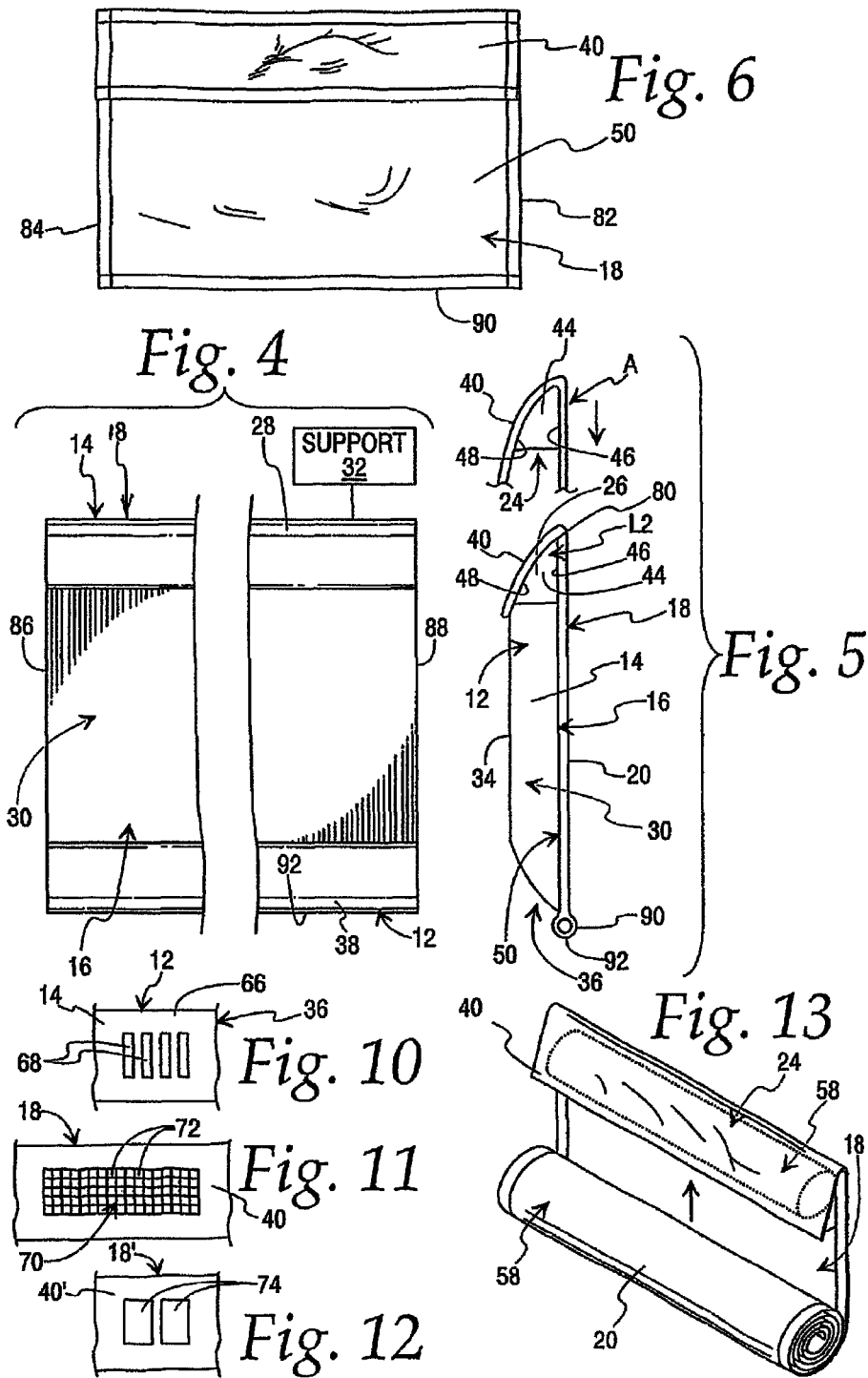

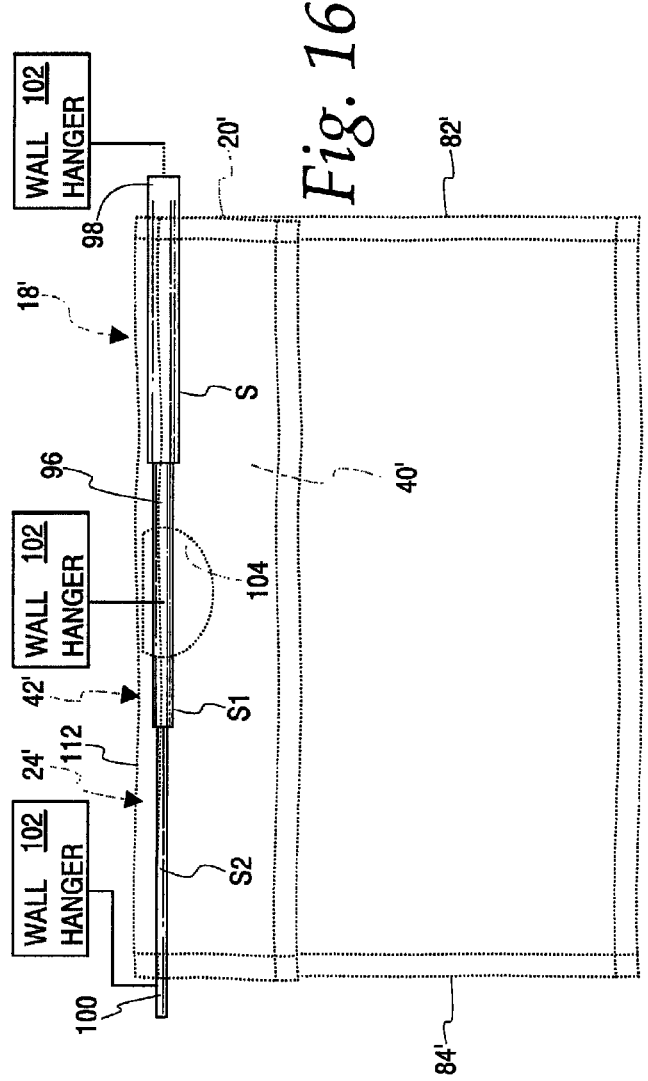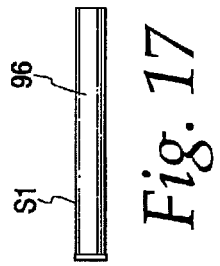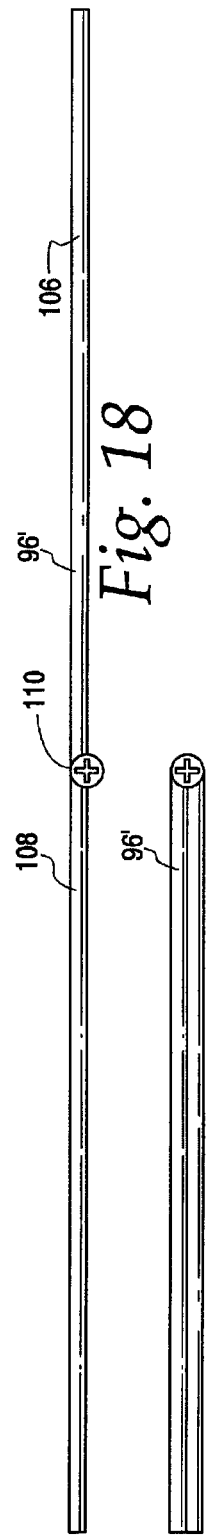

SYSTEM FOR INTEGRATING ELECTRONIC MONITORS INTO A ROOM DECOR

BACKGROUND OF THE INVENTION

1. Field of the Invention

This invention relates to electronic monitors, such as those used on computers and televisions and, more particularly, to a system for strategically covering the monitors to integrate them into the décor of a room in which they reside.

2. Background Art

The proliferation of computers and flat screen televisions has led to the placement of a multitude of monitors throughout residences and businesses. It is not uncommon to see multiple monitors in a single room, as in home offices, bedrooms, living rooms, etc.

Developing technology has allowed monitors to be made with a minimal depth and with a square front that consists of the projection area with but a modest width of frame therearound. This structural compaction has allowed users to select large monitors without having to contend with obtrusive cabinetry that was typical of earlier tube technology.

Current monitor design lends itself to different types of support. Brackets are commonly used to wall mount monitors. Alternatively, stands are used to support the monitors upon horizontal surfaces such as on the tops of tables, cabinet shelves, desks, etc.

These large monitors, by reason of their size and clarity, are visually dramatic when in use. However, when the monitors are not in use, they are equally dramatic in terms of dominating large areas of rooms in which they reside. Generally, the monitors will have a black front projection area, with the surrounding frames offered in different colors for aesthetic coordination.

With the monitors shut down, users contend with primarily two different problems. First of all, the monitors not only act as receptacles for dust, but tend to attract dust particles. Heated plastic components having exposed surfaces commonly become electrically charged, as a result of which they tend to draw and cause the adherence of dust particles.

The attraction of dust particles creates aesthetic and potentially operational problems. Accumulated dust may have to be periodically removed by a user to avoid an unsightly appearance of the monitor in a room. Repeated cleaning, particularly of the monitor surface through which images are seen, may cause scratching and eventually detract from the quality of the projected image.

Further, the venting systems used by these monitors typically will consist of upper vent openings that provide passages for egress of particles to within the monitor housing wherein they might accumulate on electronic components. Significant accumulation of particles upon working components may lead to overheating and eventually component failure. This latter condition is aggravated by manual dust removal that often causes the inadvertent direction of particles through the vent openings to within the housing.

As noted above, another significant drawback with large monitors, be they wall or table mounted, is that they often visually dominate portions, or the entirety of, a wall or room. The monitors may thus significantly detract from the décor in a room that may have been designed with a carefully selected theme or style that is not compatible with the presence of the monitors.

This problem has been recognized for many years and, since the introduction of this flat screen technology, many attempts have been made to integrate the monitors into a room décor. One such attempted solution is set forth in U.S. Pat. No. 7,312,836 (Maxson), which shows a cover panel component that can be selectively moved to block and expose a front region of a monitor. The structure in Maxson requires a fairly elaborate mounting system that may be quite expensive and also take up a significant amount of space in addition to that occupied by the monitor itself. Maxson's structure does not appear to be configured to protect, particularly the vent region of the monitors, from dust accumulation and, in fact, may complicate access to this and other areas for cleaning and creates additional contours that must be accessed, potentially inconveniently, to extract dust.

Further, in the event that the front component is not repositioned after monitor use to cover the same, it represents an obtrusive frontal projection that potentially is more visually offensive than the monitor alone.

It is also known to provide relatively expensive cabinetry to define a receptacle for a monitor. While this approach does eliminate much of the dust accumulation problem, it generally will involve a significant expense and structure that potentially becomes dominant to the eye to the point that it performs counterproductively in terms of hiding the presence of the monitor when not in use.

In spite of the long-recognized desirability of protecting and integrating monitors into a room décor, the inventor herein knows of no commercial options that are feasible. To be practical, the system must be such that it can be conveniently reconfigured by a user. Otherwise, the system is likely not to be employed or to be left in a single state which may ultimately defeat its purpose. The system must be practical also from an economic standpoint. Further, ideally the system would not add appreciably to the space occupied by the monitor itself. Still further, the system should be such that it is capable of causing the monitors to blend into, or otherwise be compatible with, surrounding décor. Additionally, the system should not in any way impair or compromise the use or function of the monitor.

Many of the above design objectives compete with each other and it is believed that this may have contributed to the fact that no viable systems have been devised for commercial use to this date. That is in spite of the fact that the number of monitors existing in homes and businesses continues to increase.

SUMMARY OF THE INVENTION

In one form, the invention is directed to a monitor system having: a) a monitor for an electronic device with a frame and a substantially flat front wall at which an image is projected; and b) a cover assembly with a front wall that is configured to block the flat front wall of the monitor with the cover assembly operatively engaged with the monitor. The cover assembly further has a mounting assembly that allows the cover assembly to be changed between: i) a first state wherein the cover assembly is fully separated from the monitor; and ii) a second state wherein the cover assembly is operatively engaged with the monitor. The mounting assembly has a pocket that opens in a first direction and aligns with the monitor with the cover assembly in a pre-assembly position. The pocket is movable in the first direction relative to the monitor from the pre-assembly position to cause a first part of the monitor to be seated in the pocket with the cover assembly in the second state.

In one form, the first direction is substantially a downward direction so that a weight of the cover assembly urges the first part of the monitor into the pocket.

In one form, the first part of the monitor has at least one ventilation opening and the cover assembly has at least one opening alignable with the at least one ventilation opening, with the cover assembly operatively engaged, to allow passage of air from the at least one ventilation opening into a space in which the monitor resides.

In one form, the cover assembly has a mesh material that defines the at least one opening in the cover assembly.

In one form, the front wall of the cover assembly is made from a flexible material that can be rolled around a first axis to compact the front wall of the cover assembly to a cylindrical shape.

In one form, the cover assembly further has a core assembly that defines the first axis and around which the flexible material can be wrapped.

In one form, the core assembly has an elongate rod with a length that extends substantially horizontally with the cover assembly operatively engaged with the monitor.

In one form, the cover assembly incorporates an elastic material that allows a fore-and-aft dimension of the pocket to be varied to thereby accommodate monitors with different fore-and-aft dimensions.

In one form, the cover assembly has a receptacle that receives the elongate rod.

In one form, the front wall of the cover assembly is made from a cloth material.

In one form, the monitor system is in combination with a room in which the monitor system resides. The room has a selected décor and the front wall of the cover assembly has a front surface that is coordinated to be compatible with the selected décor of the room.

In one form, the front surface is coordinated by at least one of: a) being colored to be compatible with one or more colors in the room; b) having subject matter thereon that is commonly used for a wall-mounted picture; and c) having subject matter thereon that simulates one or more objects that matches one or more objects in the room.

In one form, the pocket and front wall are configured so that the cylindrical shape can be placed in a stored position within the pocket.

In one form, the pocket is defined by a flap that folds at a horizontal line and is separately connected to the front wall of the cover assembly at first and second laterally spaced locations.

In one form, the flap is connected to the front wall of the cover assembly utilizing elastic material at the first and second laterally spaced locations to allow a fore-and-aft dimension of the pocket to be varied.

In one form, the mesh material defines at least a part of the pocket.

In one form, the mesh material is an elastic mesh material to allow a fore-and-aft dimension of the pocket to be varied.

In one form, the invention is directed to the combination of a room having a selected décor and a monitor system. The monitor system has a monitor for an electronic device having: a) a frame and a substantially flat front wall at which an image is projected; and b) a cover assembly with a front wall that is configured to block the flat front wall of the monitor with the cover assembly operatively engaged with the monitor. The cover assembly further includes a mounting assembly that allows the cover assembly to be changed between: i) a first state wherein the cover assembly is fully separated from the monitor; and ii) a second state, wherein the cover assembly is operatively engaged by the monitor, by simply relatively moving the cover assembly relative to the monitor. The front wall of the cover assembly has a front surface that is coordinated to be compatible with the selected décor of the room by at least one of: a) being colored to be compatible with one or more colors in the room; b) having subject matter thereon that is commonly used for a wall-mounted picture; and c) having subject matter thereon that simulates one or more objects that matches one or more objects in the room.

In one form, the cover assembly has an elongate rod and the front wall of the cover assembly is capable of being rolled around the elongate rod into a cylindrical shape.

In one form, the cover assembly has a pocket to receive the cylindrical shape with the cylindrical shape in a stored position.

BRIEF DESCRIPTION OF THE DRAWINGS

FIG. 1 is a schematic representation of one form of monitor system, according to the present invention, including a monitor and a cover assembly operatively engaged therewith through a mounting assembly;

FIG. 2 is a schematic representation of portions of the cover assembly and monitor that make up the mounting assembly in FIG. 1;

FIG. 3 is a perspective view of a specific form of monitor and cover assembly, as shown in FIGS. 1 and 2, with the cover assembly operatively engaged with the monitor;

FIG. 4 is a front elevation view of the monitor in FIG. 3;

FIG. 5 is a side elevation view of the monitor and cover assembly in FIG. 3 with the cover assembly operatively engaged with the monitor;

FIG. 6 is a rear elevation view of the cover assembly in FIGS. 3 and 5;

FIG. 7 is an enlarged, cross-sectional view of the cover assembly and monitor taken along lines 7-7 of FIG. 3;

FIG. 8 is an enlarged, cross-sectional view of the cover assembly taken along line 8-8 of FIG. 3 and showing a core assembly around which a front wall on the cover assembly is wrapped to effect storage thereof;

FIG. 9 is a reduced, bottom view of the cover assembly in FIGS. 3 and 5-8;

FIG. 10 is a fragmentary, plan view of ventilation openings on a top of the monitor in FIGS. 3 and 4;

FIG. 11 is a fragmentary, plan view of part of the cover assembly that overlies the portion of the monitor shown in FIG. 10 and made with a mesh material;

FIG. 12 is a view as in FIG. 11 with discrete openings used instead of a mesh material;

FIG. 13 is a perspective view of the cover assembly in FIGS. 3 and 5-12 being rolled preparatory to being placed in a pocket, defined by the cover assembly, for storage;

FIG. 16 is an elevation view of a modified form of cover assembly, according to the invention, and including a hanging rod;

FIG. 17 is an elevation view of the hanging rod in FIG. 16 in a collapsed state;

FIG. 18 is an enlarged, elevation view of a modified form of hanging rod; and

FIG. 19 is a view as in FIG. 18 wherein the hanging rod is collapsed to a compacted state.

DETAILED DESCRIPTION OF THE PREFERRED EMBODIMENT

Figure 14:
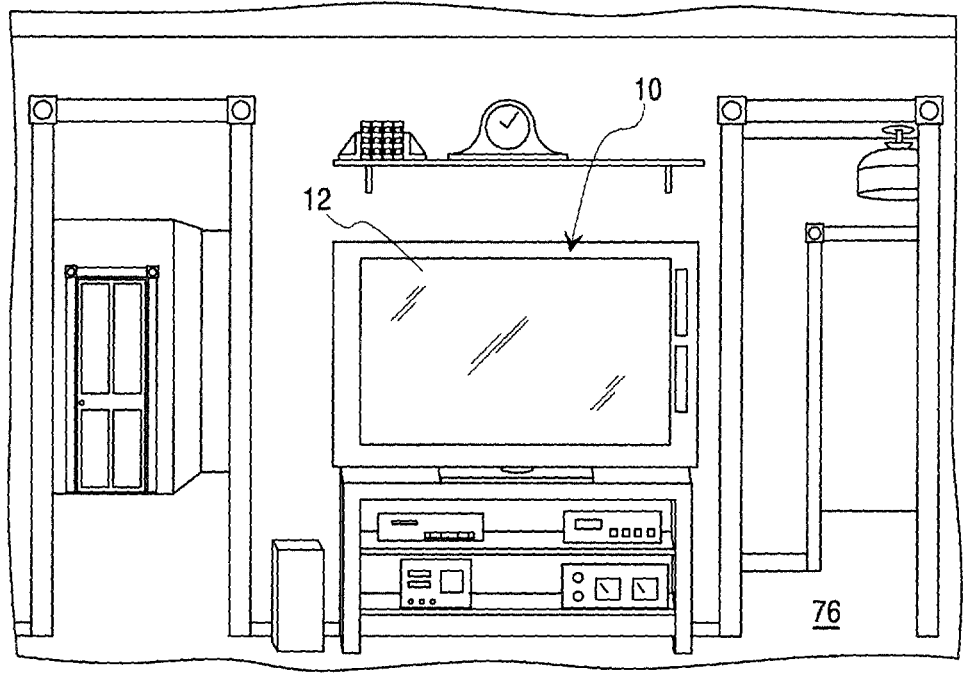
FIG. 14 is a front perspective view of a room with a monitor therein without the inventive cover assembly thereon.

Referring initially to FIG. 1, a schematic representation of a monitor system, according to the present invention, is shown at 10. The monitor system 10 consists of a monitor 12 for an electronic device. The electronic device may be a television or a computer with which the monitor 12 is associated. The monitor 12 has a frame 14 and a substantially flat, front wall 16 at which an image is projected.

A cover assembly 18 has an opaque front wall 20 that is configured to block the front wall 16 of the monitor 12 with the cover assembly 18 operatively engaged with the monitor 12.

A mounting assembly 22 functions to allow the cover assembly 18 to be changed between a first state, wherein the cover assembly 18 is fully separated from the monitor 12, and a second state, wherein the cover assembly 18 is operatively engaged with the monitor 12.

The mounting assembly 22 may be on the monitor 12 alone, the cover assembly 18 alone, or consist of components on each of the monitor 12 and cover assembly 18 that cooperate to allow the change of state for the cover assembly 18 to be effected.

Ideally, the mounting assembly 22 allows the cover assembly 18 to be changed from the first state into the second state by simply relatively moving the cover assembly 18 relative to the monitor 12 without requiring use of separate fasteners or other manual reconfiguration other than that resulting from the movement of the cover assembly 18 relative to the monitor 12 in a predetermined manner, as hereinbelow described.

In FIG. 2, one form of mounting assembly 22 is shown in the form of a pocket 24 on the cover assembly 18. The pocket 24 opens in a first direction and is alignable with the monitor 12 with the cover assembly 18 in a separated, pre-assembly position. The pocket 24 is movable in the first direction relative to the monitor 12 from the pre-assembly position to cause a part 26 of the monitor 12 to be seated in the pocket 24 with the cover assembly 18 in the second state.

One specific form of cover assembly 18, as shown in FIGS. 1 and 2, is shown in FIGS. 3-11 in association with a monitor 12. The monitor 12 has a generally squared shape with the front wall 16 that is substantially flat. The frame 14 defines a border 28 around the front wall 16 and bounds a compartment 30 within which operating components (not shown) reside.

The frame 14 is associated with a support 32 by which the monitor 12 is maintained in a desired operative orientation. The support 32 may be in the form of a bracket for wall mounting or may be a base that is supported on a flat surface such as on a desk or shelf.

The frame 14 has a back wall 34 that is generally complementary in shape to the front wall 16 and slightly smaller in area so that a perimeter wall at 36 is angled between the front and back walls 16, 34.

The cover assembly 18 has the aforementioned front wall 20 that is substantially matched to the shape of the front monitor wall 16 including a front surface 38 on the portion of the frame 14 extending around the portion of the front wall 16 through which the image is projected.

The cover assembly 18 further includes a flap 40 that is joined to the front wall 20 in a manner so as to define the pocket 24. In this embodiment, the pocket 24 is designed to open in a downward direction. The flap 40 is connected to the front wall 20 so as to be foldable about a first horizontal line at 42. A clearly defined fold line may be formed into the cover assembly 18. Alternatively, the front wall 20 and flap 40 may be formed as a continuous sheet of material that is readily bendable at the line 42.

The general shape of the pocket 24 is maintained by separately connecting the flap 40 to the front wall 20 at at least one location, and more preferably at first and second laterally spaced locations L1, L2.

The connection at exemplary location L2 consists of a generally V-shaped piece of material 44 that spans between facing surfaces 46, 48 on the front wall 20 and flap 40, respectively. The material 44 may be generally inextensible or elastic in nature, thereby to allow the fore-and-aft dimension of the pocket 24 to be varied, as indicated in FIG. 7, to accommodate monitors 12 with different dimensional thicknesses. Further, the use of an elastic material allows stretching, and thereby the generation of restoring forces, that cause the cover assembly 18 to squeeze the portion of the monitor 12 within the pocket 24. This action positively holds the cover assembly 18 in place.

The cover assembly 18 is preferably made from a material that allows the overall size to be compacted when the cover assembly 18 is not in use. As one example, the front wall 20 and flap 40 may be made from a continuous flexible material, such as a quilted cloth or a thin fabric layer. Alternatively, the flap 40 might be made more rigid with the front wall 20 connected thereto being more readily compactable as by folding or rolling. Some preferred materials are canvas, tapestry, or cotton fabric. Quilt batting may be provided on the inside surface 50 of the cover assembly 18 that contacts the monitor 12.

With a readily foldable/rollable material, one or more weights 52 can be incorporated to supplement the weight forces of the front wall in drawing the bottom region of the front wall 20 into at least a moderately stretched condition, as to avoid bunching or wrinkling.

In one form, a core assembly at 54 is incorporated into the bottom region of the front wall 20 and performs at least one of two functions. In the embodiment shown, the core assembly 54 consists of one or more elongate rods with a length that extends substantially horizontally with respect to the operatively engaged cover assembly 18. The rod/core assembly 54 may have a sufficient weight to add to the weight of the rest of the cover assembly 18 itself that urges the part 26 of the monitor 12 into the pocket 24 and tends to stretch the front wall 20 across the front wall 20 of the monitor 12 at the front thereof.

The rod(s) 54 has an axis 56 and defines a component about which the material of the front wall 20 can be rolled to compact the front wall 20 of the cover assembly 18 into a cylindrical roll shape, as shown at 58 in FIGS. 8 and 13, centered nominally around the axis 56.

In this embodiment, a portion 60 of the front wall 20 is in turn bent and held against itself by stitching 62 to define a receptacle 64 which accepts the rod(s)/core assembly 54.

As shown in FIG. 10, a top length 66 of the perimeter wall 36 of the frame 14 has at least one opening 68, and as depicted, a plurality of ventilation openings 68. A portion 70 of the flap 40 that overlies the ventilation openings 68 with the cover assembly 18 operatively engaged has at least one opening alignable with the ventilation opening(s) 68 to allow passage of air from the ventilation opening(s) 68 into a space in which the monitor 12 resides. In FIG. 11, the portion 70 is shown to be made with a mesh material that defines a network of openings 72.

Alternatively, as shown in FIG. 12, discrete openings 74 may be formed in the flap 40' through a surface of the flap on a cover assembly 18' where the same register with the ventilation openings 68 on the monitor 12.

The mesh material defining the flap portion 70 in FIG. 11 defines at least a part of the pocket 24 and may be made from an elastic material to flex to accommodate fore-and-aft dimensional variation of the pocket 24.

Figure 15:
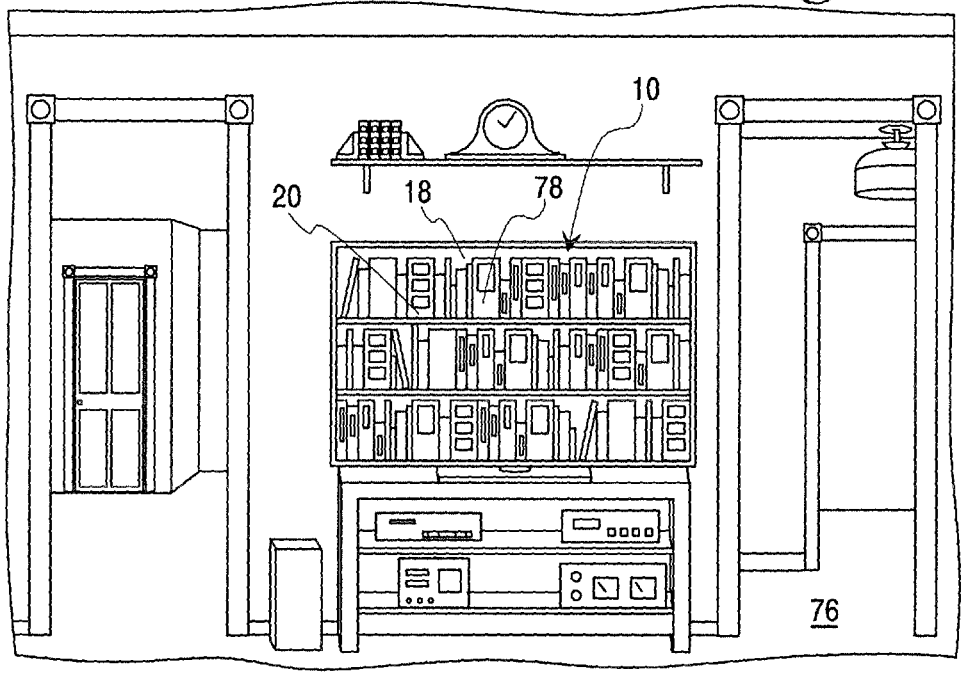
FIG. 15 is a view as in FIG. 14 wherein the cover assembly is operatively placed.

As shown in FIGS. 14 and 15, the monitor system 10 is contemplated to be used in a room 76 with a particular décor/decorating theme. The front wall 20 of the cover assembly 18 has a front surface 78 that is coordinated to be compatible with the selected décor of the room 76.

As shown in FIG. 14, the monitor 12, with the cover assembly 18 removed, defines a darkened mass at its mounting/support location. As shown in FIG. 15, the front surface 78 is coordinated by producing the appearance of a bookshelf with books thereon.

The front surface 78 may be coordinated by at least one of: a) being colored to be compatible with one or more colors in the room 76; b) having subject matter thereon that is commonly used for a wall mounted picture in the room 76, as shown in FIG. 3; and c) having subject matter thereon that simulates one or more objects that matches one or more objects in the room 76.

To operatively engage the cover assembly 18, the cover assembly 18 is placed initially in the aforementioned first state, as shown at A in FIG. 5, wherein the cover assembly 18 is fully separated from the monitor 12. With the cover assembly 18 in the first state, as shown in FIG. 5, the cover assembly 18 is in a pre-assembly position wherein the pocket 24 aligns with the top edge 80 of the monitor 12. From the pre-assembly position, the cover assembly 18 is moved downwardly relative to the monitor 12 to cause the part 26 of the monitor 12 to move into and seat within the pocket 24. Further drawing of the cover assembly 18 downwardly fully seats the monitor part 26, whereupon the weight of the front wall 20 and that of any added weight(s) 52 and/or the core assembly 54 cause the draped front wall 20 to be drawn relatively taut.

In the depicted embodiments, the side edges 82, 84 of the front wall 20 of the cover assembly 18 are respectively flush with the side edges 86, 88 of the front wall 16 on the monitor 12 so that the front wall 16 does not wrap around sides of the monitor, which thus remain exposed. The side edges 82, 84 might alternatively wrap around the monitor.

Likewise, the bottom edge 90 of the front wall 20 is shown to be flush with the bottom edge 92 of the front wall 16 on the monitor 12. Similarly, a wrapped arrangement could be integrated into the design with fitting facilitated by strategically incorporating elastic material or integral straps or fasteners.

It is preferred that, regardless of its construction, the cover assembly 18 be fittable by simply maneuvering the cover assembly 18 relative to the monitor 12 without requiring any separate fasteners.

When it is desired to use the monitor 12, the cover assembly can be fully separated therefrom whereupon the front wall 20 can be rolled, as shown in FIG. 13, to produce the cylindrical rolled shape 58 that can be tucked into the pocket 24, whereby the pocket conveniently doubles as a storage receptacle/container for the rolled shape 58.

A modified form of cover assembly is shown at 18' in FIG. 16. The cover assembly 18' has the same overall construction as the cover assembly 18 with a modification to allow the incorporation of a hanging rod 96, as shown in FIGS. 16 and 17.

The hanging rod 96 has telescopingly engaged sections S, S1, S2 that can be relatively moved to place the hanging rod 96 selectively in an extended state, as shown in FIG. 16, and a compacted state, as shown in FIG. 17.

The extended hanging rod 96 can be directed through the pocket 24' between the front wall 20" and flap 40' so that opposite ends 98, 100 project respectively beyond the side edges 82', 84'. The projecting ends 98, 100 can be engaged with conventional wall hangers 102 to support the cover assembly 18' as a decorative wall hanging, as when it is not in use.

Alternatively, an opening 104 can be provided in the cover assembly 18 to engage a like wall hanger 102.

When the hanging rod 96 is not utilized, it can be compacted to the FIG. 17 state and stored, as in the pocket 24', or otherwise.

As an alternative to using a telescoping arrangement, a modified form of hanging rod 96', shown in FIGS. 18 and 19, can be constructed with sections 106, 108 joined at a hinge location 110 that allows the hanging rod 96' to be placed in an extended state, shown in FIG. 18, or a folded and collapsed state, shown in FIG. 19.

With either configuration, the nonprojecting length of the hanging rod 96, 96', extended through the pocket 24', will seat under a bight portion 112 where the flap 40' is folded relative to the front wall 20' at the horizontal line 42'.

The rods 96, 96' may be provided in addition to the rod/core assembly 54 or, alternatively, perform the function of the rod/core assembly 54 when the rods 96, 96' are not used for hanging.

The ability to remove the rods 96, 96' and rod/core assembly 54 also allows the cover assemblies 18, 18' to be folded into a compact state for storage, as when not in use.

The foregoing disclosure of specific embodiments is intended to be illustrative of the broad concepts comprehended by the invention.

The invention claimed is:

1. A monitor system comprising:
a monitor for an electronic device comprising a frame and a substantially flat front wall at which an image is projected; and
a cover assembly comprising an opaque front wall that is configured to block the flat front wall of the monitor with the cover assembly operatively engaged with the monitor,
the front wall of the cover assembly having a top edge, a bottom edge, and first and second side edges,
the cover assembly further comprising a mounting assembly that allows the cover assembly to be changed between: a) a first state wherein the cover assembly is fully separated from the monitor; and b) a second state wherein the cover assembly is operatively engaged with the monitor,
the mounting assembly comprising a pocket that opens in a first direction from one of the edges of the cover assembly towards another of the edges of the cover assembly and aligns with the monitor with the cover assembly in a pre-assembly position,
the pocket movable in the first direction relative to the monitor from the pre-assembly position to cause a first part of the monitor to be seated in the pocket with the cover assembly in the second state,
the pocket extending only partially from the one edge towards the another edge of the cover assembly,
wherein the one edge is the top edge, the another edge is the bottom edge, and the first direction is substantially a downward direction toward the bottom edge of the cover assembly so that a weight of the cover assembly urges the first part of the monitor into the pocket,
wherein the pocket is defined by a flap and the front wall of the cover assembly,
wherein the flap is connected to the front wall of the cover assembly utilizing elastic material that is different than a material defining at least one of the flap and front wall of the cover assembly to allow a fore-and-aft dimension of the pocket to be varied.

2. The monitor system according to claim 1 wherein the monitor has at least one ventilation opening and the cover assembly has at least one discrete opening formed through the cover assembly and alignable with the at least one ventilation opening with the cover assembly operatively engaged to allow passage of air from the at least one ventilation opening into a space in which the monitor resides.

3. The monitor system according to claim 2 wherein the cover assembly comprises a mesh material that defines the at least one discrete opening through the cover assembly.

4. The monitor system according to claim 1 wherein the front wall of the cover assembly is made from a flexible material that can be rolled around a first axis to compact the front wall of the cover assembly to a cylindrical shape.

5. The monitor system according to claim 4 wherein the cover assembly further comprises a core assembly that is separate from the front wall of the cover assembly and defines the first axis and around which the flexible material can be wrapped.

6. The monitor system according to claim 1 wherein the front wall of the cover assembly is made from a cloth material.

7. The monitor system according to claim 1 in combination with a room in which the monitor system resides, the room having a selected décor, the front wall of the cover assembly having a front surface that is coordinated to be compatible with the selected décor of the room.

8. The combination according to claim 7 wherein the front surface is coordinated by at least one of: a) being colored to be compatible with one or more colors in the room; b) having subject matter thereon that is commonly used for a wall-mounted picture; and c) having subject matter thereon that simulates one or more objects that matches one or more objects in the room.

9. The monitor system according to claim 4 wherein the pocket and front wall are configured so that the cylindrical shape can be placed in a stored position within the pocket.

10. The monitor system according to claim 3 wherein the mesh material defines at least a part of the pocket.

11. The monitor system according to claim 1 wherein the pocket extends less than one half of a distance between the top and bottom edges of the cover assembly.

12. The monitor system according to claim 1 wherein the front wall of the cover assembly has a front surface that is coordinated to be compatible with a selected décor of a room in which the monitor system resides by at least one of: a) being colored to be compatible with one or more colors in the room; b) having subject matter thereon that is commonly used for a wall-mounted picture; and c) having subject matter thereon that simulates one or more objects that matches one or more objects in the room.

13. The monitor system according to claim 1 wherein the mounting assembly further comprises at least one weight that draws a bottom region of the front wall downwardly to avoid bunching and wrinkling.

14. The monitor system according to claim 1 wherein the flap is connected to the front wall of the cover assembly utilizing elastic material that is different than the material defining at least one of the flap and front wall of the cover assembly at first and second laterally spaced locations to allow the fore-and-aft dimension of the pocket to be varied.

15. A monitor system comprising:
a monitor for an electronic device comprising a frame and a substantially flat front wall at which an image is projected and spaced side walls; and
a cover assembly comprising a front wall that is configured to block the flat front wall of the monitor with the cover assembly operatively engaged with the monitor, top and bottom edges, and first and second side edges,
the cover assembly further comprising a mounting assembly that allows the cover assembly to be changed between: a) a first state wherein the cover assembly is fully separated from the monitor; and b) a second state wherein the cover assembly is operatively engaged by the monitor by simply relatively moving the cover assembly relative to the monitor,
wherein the front wall of the cover assembly has a front surface that is coordinated to be compatible with the selected décor of the room by at least one of: a) being colored to be compatible with one or more colors in the room; b) having subject matter thereon that is commonly used for a wall-mounted picture; and c) having subject matter thereon that simulates one or more objects that matches one or more objects in the room,
wherein the cover assembly comprises a pocket defined between the front wall on the cover assembly and a rearwardly facing flap,
the pocket extending only partially from the top edge toward the bottom edge,
wherein with the cover assembly operatively engaged with the monitor a portion of the monitor resides in the pocket between the front wall on the cover assembly and the rearwardly facing flap,
wherein the cover assembly is configured so that with the cover assembly operatively engaged with the monitor, the front wall has a flat configuration that overlies the front wall of the monitor but does not wrap against the side walls of the monitors whereby the side walls of the monitor remain uncovered by the cover assembly below the pocket,
the cover assembly further comprising at least one weight that draws a bottom region of the front wall downwardly to avoid bunching and wrinkling,
wherein the cover assembly comprises an elongate rod, the front wall of the cover assembly capable of being rolled around the elongate rod into a cylindrical shape.

16. The combination according to claim 15 wherein the pocket is configured to receive the cylindrical shape with the cylindrical shape in a stored position.

* * * * *